(12) United States Patent
Öner et al.

(10) Patent No.: US 11,116,231 B2
(45) Date of Patent: Sep. 14, 2021

(54) VEGETABLE-FRUIT PULP CRISP

(71) Applicant: TUBITAK, Ankara (TR)

(72) Inventors: Erdem Öner, Kocaeli (TR); Elmas Olgun Öktem, Kocaeli (TR); Tarik Tuncan Öztürk, Kocaeli (TR)

(73) Assignee: TUBITAK, Ankara (TR)

( * ) Notice: Subject to any disclaimer, the term of this patent is extended or adjusted under 35 U.S.C. 154(b) by 132 days.

(21) Appl. No.: 16/474,039

(22) PCT Filed: Dec. 21, 2017

(86) PCT No.: PCT/IB2017/058274
§ 371 (c)(1),
(2) Date: Jun. 26, 2019

(87) PCT Pub. No.: WO2018/122697
PCT Pub. Date: Jul. 5, 2018

(65) Prior Publication Data
US 2019/0387761 A1 Dec. 26, 2019

(30) Foreign Application Priority Data
Dec. 27, 2016 (TR) .................. 2016/19741

(51) Int. Cl.
| | |
|---|---|
| *A23C 1/08* | (2006.01) |
| *A23C 9/123* | (2006.01) |
| *A23L 19/00* | (2016.01) |
| *A23C 9/127* | (2006.01) |
| *A23C 9/133* | (2006.01) |
| *A23C 9/156* | (2006.01) |

(52) U.S. Cl.
CPC ................ *A23C 1/08* (2013.01); *A23C 9/123* (2013.01); *A23C 9/127* (2013.01); *A23C 9/133* (2013.01); *A23C 9/156* (2013.01); *A23L 19/09* (2016.08)

(58) Field of Classification Search
CPC ........... A23C 1/08; A23C 9/123; A23C 9/133; A23C 9/156; A23L 19/09
USPC ...................................................... 426/385
See application file for complete search history.

(56) References Cited

U.S. PATENT DOCUMENTS

| | | | |
|---|---|---|---|
| 3,360,374 A | 12/1967 | Barr et al. | |
| 4,305,969 A * | 12/1981 | Munk ............... | A23L 7/117 426/580 |
| 2008/0220140 A1 * | 9/2008 | Ley ................ | A23L 27/88 426/538 |

FOREIGN PATENT DOCUMENTS

| | | | | |
|---|---|---|---|---|
| CN | 105661203 A | * | 6/2016 | |
| CN | 106072104 | | 11/2016 | |
| GB | 2510351 | | 8/2014 | |
| GB | 2510351 A | * | 8/2014 | ......... A23L 19/09 |

OTHER PUBLICATIONS

Schwenk, Cultured Food for Life, Chapter 2 (Year: 2013).*

* cited by examiner

*Primary Examiner* — Brent T O'Hern
(74) *Attorney, Agent, or Firm* — Crose Law LLC; Bradley D. Crose

(57) ABSTRACT

The invention relates to a method of obtaining vegetable and/or fruit pulp crisp which is easy to eat any time and does not comprise any additive. The invention is a production method of vegetable-fruit pulp crisp, characterized by comprising the process steps of: squeezing fruits-vegetables and thus dewatering the same and obtaining the pulp thereof; adding a concentrated milk product into the obtained pulp; mixing all the contents; shaping the mixture; spreading the shaped products on the tray; freezing the products on the trays; and lyophilization of the frozen products under vacuum.

3 Claims, No Drawings

VEGETABLE-FRUIT PULP CRISP

TECHNICAL FIELD OF THE INVENTION

The present invention relates to a method of obtaining a crispy product which is produced from vegetable and/or fruit pulp and which may be directly consumed.

The invention more particularly relates to a method of obtaining vegetable and/or fruit pulp crisp which is easy to eat any time and does not comprise any additive.

PRIOR ART

Most vegetables and fruits are rich in nutrients, low-calorie and high-fiber. And most vitamins and minerals that are needed daily can be taken from vegetables and fruits without receiving excessive energy. If consumed adequately, vegetable and fruit helps lowering blood pressure and reduces the risk of having a heart attack.

Several methods have been developed with a view to facilitate consuming vegetable and fruit, and to elongate their shelf life.

The Canadian Patent Application Numbered CA2559380 filed on 11 Mar. 2008 within the state of the art discloses dried fruits that are made into ready-to-eat crispy products by extrusion. However, the entire fruit is used in order that the processed fruit will remain crispy and fruit pulp cannot be used in this patent. However, the fruits are subject to heat treatment at high temperature. In this patent, high sugar content fruits are used and vegetables are not mentioned.

In the Chinese Patent Document Numbered CN103340362 filed on 14 Jun. 2013 within the state of the art, a fruit and vegetable crisp chip is manufactured from vegetables and fruits by microwave vacuum freeze drying; however, subsequent to treating the fruits and vegetables at high temperature, the concentrate obtained from all fruit and vegetables is again subject to heat treatment for puree enzyme inactivation, and then the water within the puree is evaporated for 3-5 hours under 0.06-0.08 MPa vacuum at 55-75° C., thereby increasing the dry matter rate of the puree to 65-75%. The concentrated puree is not suitable for chip production in this form and a stabilizing mixture of pectin, xanthan gum and CMC-Na is added therein along with potato starch, sweet potato starch or corn starch between 10 and 20% as maturing agent in order to achieve a crispy structure. In this patent, the pulp of the vegetable and fruit which is obtained after dewatering is not used, fruit/vegetable puree is subject to heat treatment repeatedly, the puree is concentrated, and starch and many other additives are added in order to achieve a crispy non-dispersible form.

The U.S. Pat. No. 4,233,334 filed on 19 Mar. 1979 within the state of the art discloses beaten cellulose pulp. Here, the pulp is mixed with sugar and air dried, and this mixture is squeezed and added into powdered beverages. In this patent, sugar is added to the pulp, which is not desired by health-conscious consumers who will buy vegetable crisps, and the drying process is not performed such that essential bioactive ingredients within the vegetable and fruit pulp will be preserved. Further, there is no information about the texture obtained after drying.

In the Chinese Patent Application Numbered CN103493886 filed on 11 Oct. 2013 within the state of the art, on the other hand, fruit/vegetable and yoghurt are used and a healthy food is obtained therefrom without heat treatment. Here, however, the entire fruit but not the pulp thereof is used and the obtained product has a puree form rather than a crispy one. This patent does not disclose the fact that health benefits are significantly protected using fruit and vegetable pulp, either.

In the U.S. Pat. No. 4,477,481 filed on 24 Jun. 1982 within the state of the art, natural citrus pulp is freeze-dried by adjusting the pH to 4. In this patent document, the use of the pulp obtained as a powdered beverage by grinding is disclosed; nevertheless, no explanation about the texture of the obtained pulp is given.

In the UK Patent Application Numbered GB2184334 filed on 7 Oct. 1985 within the state of the art, a health food containing lyophilized kefir and other active ingredients is disclosed. In this patent, however, health effects of the obtained food are mentioned and the texture of the product is described as white powder; additionally, a crispy product is not prepared by lyophilization of kefir.

The Japanese Patent Document Numbered JP2987702 within the state of the art discloses the fruit or vegetable itself, not the pulp thereof, is used and a powder product, not a crispy one, is obtained after lyophilization. It is aimed here to crystallize the saccharide ingredient in the product in order to improve the solubility of the powder; in the method according to the invention, however, sugar is removed from the product in fruit and/or vegetable juice form and condensed kefir or yoghurt is added therein in order to achieve a crispy product.

The fact that there exists no crunchy product which is obtained from vegetable and/or fruit pulp and which may be directly consumed without adding any additive has deemed it necessary to develop the production method of the vegetable and/or fruit pulp crisp according to the invention.

OBJECTS AND SUMMARY OF THE INVENTION

The object of the present invention is to provide the method of producing a vegetable-fruit pulp crisp which does not comprise any additive.

Another object of the present invention is to provide the method of producing a vegetable-fruit pulp crisp by removing fruit and/or vegetable juice by squeezing.

Another object of the present invention is to provide the method of producing a vegetable-fruit pulp crisp by adding strained yoghurt and/or concentrated kefir into the vegetable and fruit pulp.

And another object of the present invention is to provide the method of producing a vegetable-fruit pulp crisp by freeze drying.

In the method according to the invention, the pulp comprising fibers as well as the residual and essential bioactive ingredients obtained by squeezing the fruit juice is used. The pulp is mixed with strained yoghurt and/or kefir. With the freeze drying of the obtained product, a high vegetable-fruit pulp product in crispy and bar form the texture and mouthfeel of which are improved is achieved.

DETAILED DESCRIPTION OF THE INVENTION

The production method of vegetable-fruit pulp crisp according to the invention comprises the process steps of:
  squeezing fruits-vegetables and thus dewatering the same and obtaining the pulp thereof,
  adding a concentrated milk product into the obtained pulp,
  mixing all the contents,
  shaping the mixture, spreading the shaped products on the tray,
freezing the products on the trays,
lyophilization of the frozen products under vacuum, and
packaging the resulting product.

The fruit and/or vegetable is/are preferably dewatered up to 50 to 95% by squeezing. To the remaining fruit and/or vegetable pulp, a milk product or milk product powder such as concentrated milk, concentrated whey, concentrated yoghurt and concentrated kefir is added, with maximum 80% moisture and at an amount of 1 to 50% by weight, and the mixture is preferably stirred with a non-metal apparatus. In case of adding concentrated kefir with maximum 80% moisture and at an amount of 1 to 50% by weight, said kefir is heated between 50 and 90° C. and at least 20% of the initial kefir amount is removed in the form of syneresis after heating.

It is within the present invention to add any vegetable or animal origin product known to be consumed as food into the mixture.

The obtained mixture is shaped manually or by means of any forming machine or die/mold. It is also envisaged within the invention to apply filling during the shaping operation. The shaped mixture is spread over trays of metal or glass and frozen between −15° C. and −50° C. The frozen products are freeze dried, i.e. lyophilization is performed, between 3 and 48 hours under 100-0.001 mbar vacuum. After freeze drying, the crispy (crunchy) products having been obtained are packaged.

Within the scope of the invention, the products may be packaged under nitrogen gas or under vacuum in order to elongate the shelf life thereof.

It is also envisaged herein to add to the kefir oilseeds, seed flour, cereals and similar natural food additives, which partially bind the water within kefir, instead of concentrating said kefir or milk products; and to use the obtained concentrated kefir without applying heat treatment thereon.

With this method, a crunchy product which has a high fruit and vegetable pulp content, which may be directly consumed and which does not contain any additive is obtained.

EXAMPLE 10 kg of fresh carrot is washed with brush. The carrots having been washed with brush are squeezed by means of a juicer for solid fruit, and thus 3 kg carrot pulp is obtained.

In the meantime, 1.5 L of ready-to-use kefir is heated to 70° C. and the kefir is precipitated. 300 g kefir concentrate is obtained by filtering the water from 1.5 L ready-to-use kefir. The resulting kefir concentrate is vigorously mixed using a plastic spoon, and then added into 3 kg carrot pulp and the kefir is distributed inside the carrot pulp by stirring. The thus obtained pre-dough is compressed to 20 g round glass molds of 90 mm by means of a cylindrical glass, and distributed at even heights.

Round molds are put in stainless steel trays and placed the freeze dryer. After the samples are frozen for 3 hours at −25° C., the temperature is linearly increased to 25° C. in 16 hours under 0.9 vacuum, secondary drying is applied for 6 hours under 0.05 mbar pressure at 25° C., and then the trays are removed from the freeze dryer. The carrot pulp crisp in the glass molds over the tray is removed from glass containers as a whole, placed into plastic bags, and metalized plastic bags are sealed by way of heat.

The results of the analyses have shown that the thus obtained product has a glycemic index of 36; fiber content of 25 g/100 g; and a beta carotene amount of 48160 μg/100 g. Moreover, the results of the analyses have demonstrated that 64% of the beta carotene, which is one of the most important vitamins in carrot, remains in the carrot pulp crisp.

The invention claimed is:

1. A production method of vegetable-fruit pulp crisp, characterized in that it comprises the process steps of:
   dewatering fruit and/or vegetable up to 50 to 95% by squeezing fruits-vegetables and obtaining vegetable and/or fruit pulp thereof,
   adding a concentrated kefir with maximum 80% moisture and at an amount of 1 to 50% by weight into the vegetable and/or fruit pulp as a result of;
   heating between 50 and 90° C., and
   performing syneresis in the concentrated kefir after heating now at 20% of initial concentrated kefir amount,
   mixing all contents,
   shaping mixture,
   spreading shaped products on tray,
   freezing products on the tray at −15° C. to −50° C., and
   lyophilization (freeze-drying) of frozen products for 3 to 48 hours under 0.001-100 mbar vacuum.

2. The production method of vegetable-fruit pulp crisp according to claim 1, characterized in that the concentrated kefir is obtained by partially binding water in kefir by means of oilseeds, seed flour and natural food additives.

3. The production method of vegetable-fruit pulp crisp according to claim 1, characterized in that vegetable or animal origin products are added while shaping the products.

* * * * *